(12) United States Patent
Yamamoto et al.

(10) Patent No.: US 7,010,493 B2
(45) Date of Patent: Mar. 7, 2006

(54) METHOD AND SYSTEM FOR TIME-BASED STORAGE ACCESS SERVICES

(75) Inventors: Masayuki Yamamoto, Sunnyvale, CA (US); Akira Yamamoto, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 661 days.

(21) Appl. No.: 09/814,423

(22) Filed: Mar. 21, 2001

(65) Prior Publication Data
US 2002/0138691 A1    Sep. 26, 2002

(51) Int. Cl.
*G06F 17/60* (2006.01)
(52) U.S. Cl. .................. 705/1; 705/1; 705/32; 705/34; 709/220; 709/219
(58) Field of Classification Search .................... 705/1, 705/32, 34; 709/219, 220
See application file for complete search history.

(56) References Cited

U.S. PATENT DOCUMENTS

| | | | |
|---|---|---|---|
| 5,768,528 A * | 6/1998 | Stumm | 709/231 |
| 6,516,350 B1 * | 2/2003 | Lumelsky et al. | 709/226 |
| 6,721,554 B1 * | 4/2004 | Gnesda et al. | 455/406 |

FOREIGN PATENT DOCUMENTS

WO    WO 99/34297    *    7/1999

OTHER PUBLICATIONS

Coyote135, Two Thumbs Up, Jan. 7, 2001.*
Rachel Conrad, File Management Firm Nixes Popular Free Storage, Feb. 21, 2001, CNET Networks, Inc.*
Chuang et al., Distributed Network Storage Service With Quality Of Service Guarantees, Jun. 1999.*
John Chung-I-Chuang, Network Transmission And Storage: Vertical Relationship And Industry Structure, Sep. 1999.*
LUN Security Considerations for Storage Area Networks by Hu Yoshida, Hitachi Data Systems, 1999.

* cited by examiner

*Primary Examiner*—Naresh Vig
(74) *Attorney, Agent, or Firm*—Sughrue Mion, PLLC; Pavel I. Pogodin, Esq.

(57)    ABSTRACT

The present invention provides techniques for managing access to storage resources according to an access time. Specific embodiments provide a variety of different kinds of time based access billing. For example, in specific embodiments, one or more of a time time-card storage access service mode, a time-lock storage access service mode, and a semi-timecard storage access service mode are provided.

11 Claims, 14 Drawing Sheets

Overall Diagram for Storage Access Service

Overall Diagram for Storage Access Service

LDEV Access Schedule Management Table

| User Site | Host Port ID | LDEV ID | Time Zone | Access Schedule |
|---|---|---|---|---|
| A | Port 1 | 1 | GMT-8 | Daily, 8AM-10AM |
| A | Port 2 | 2 | GMT-8 | Saturday, 1AM-5AM |
| A | Port 3 | 4 | GMT-8 | All Day |

FIG. 2

LDEV Access History Table

| User Site | Host Port ID | LDEV ID | Start Time | End Time |
|---|---|---|---|---|
| A | Port 1 | 1 | 01/01/2000 AM08:00 | 01/01/2000 AM09:45 |
| A | Port 3 | 4 | 01/01/2000 AM03:00 | 01/01/2000 PM03:00 |
| A | Port 3 | 4 | 01/02/2000 AM03:00 | 01/02/2000 PM05:00 |
| A | Port 2 | 2 | 01/03/2000 AM01:00 | 01/03/2000 AM06:00 |

FIG. 3

Price List Table

| Time Zone | Time and Price List for Storage Access Service | | | |
|---|---|---|---|---|
|  | 0    5   6 | 11  12 | 17  18 | 23 |
| GMT-12 | Price D | Price A | Price B | Price C |
| GMT-11 | Price D | Price A | Price B | Price C |
| ⋮ | | ⋮ | | |
| GMT | Price A | Price B | Price C | Price D |
| ⋮ | | ⋮ | | |
| GMT+11 | Price B | Price C | Price D | Price A |
| GMT+12 | Price B | Price C | Price D | Price A |

FIG. 4

Storage Access Service Flow

"Start Service" Procedure

"Start Access" Procedure

"End Access" Procedure

"Add Service" Procedure

"Billing" Procedure

"End Permission" Procedure

"Fixed Billing" Procedure

METHOD AND SYSTEM FOR TIME-BASED STORAGE ACCESS SERVICES

BACKGROUND OF THE INVENTION

The present invention relates generally to data storage systems, and in particular to techniques for controlling storage access based on a designated time.

The information technology revolution brings with it an ever increasing need for more storage capacity for business enterprises. It is expected that the average Fortune 1000 company's storage requirement will more than double in the coming years. In addition, growth has brought shortages of skilled persons in the information technology field. These challenges confront many companies facing the need to expand and improve their information technology assets. Increasingly, companies are turning to outsourcing storage management as a method of coping with the need to grow capacity in view of rapidly increasing demand. Storage Service Providers (SSPs) is one such service for providing storage infrastructure management to business enterprises. By subscribing to an SSP, companies can obtain needed storage resources by purchasing the services from the SSP. The SSP owns storage systems, which it uses to provide storage capacity for the users' host systems, as well as provide the storage management services. Users pay for the storage usage and management services based upon the terms of a service level agreement (SLA) made between the user and the SSP.

While certain advantages to present SSP technologies are perceived, opportunities for further improvement exist. For example, according to conventional SSP technology, the SLA between the user and the SSP provides for a single rate charge for a data connection from the host system in the user site to the disk system in the SSP site. However, some SSP users would like to reduce the costs of the data connection and will be willing to accept limitations on access time. For example, users who would like to use the storage for backup purposes do not need a full-time data connection. However, conventional technology does not provide the capability to manage and charge for access to the storage services of an SSP based upon the time of the access. Further, security is an important concern to both the user and the SSP. For the user, this means that valuable business information assets can be protected by restricting access to the data in storage. For the SSP, this means that data integrity is preserved for its customers, and that no user receives access that is not authorized by the terms of the SLA.

What is needed are improved techniques for managing access to storage resources according to an access time.

SUMMARY OF THE INVENTION

The present invention provides techniques for managing access to storage resources according to an access time. Specific embodiments provide a variety of different kinds of time based access billing with variable billing rates in accordance with business arrangements between users and providers of computer storage. For example, in specific embodiments, one or more of a time time-card storage access service mode, a time-lock storage access service mode, and a semi-timecard storage access service mode are provided.

In a representative embodiment according to the present invention, an apparatus for managing storage access is provided. The apparatus comprises a disk system. The disk system comprises one or more logical device storage units (LDEVs) that store information. One or more interface ports and a control unit that is connected to the interface ports and LDEVs controls input and output to and from the LDEVs through the interface ports. The apparatus also includes a disk system manager. The disk system manager manages information storage to, retrieval from, allocation of, and de-allocation of the one or more logical device storage units in the disk system. A storage access service system is also part of the apparatus. The storage access service system comprises a memory that contains user information, including a time based component. The storage access service system grants authorization to access the one or more logical device storage units based upon the user information. The time based component comprises time zone information. One or more billing rates for each time zone are also included. The storage access service system can determine charges for user access service based upon the time zone information for the user's site, the billing rates, and an access time for the user. The user information also includes a history of accesses for the users. The storage access service system determines charges for user access service based upon the history of accesses for the users. The billing rates correspond to individual time periods within each of the time zones. The storage access service system determines charges for user access service based upon the history of accesses of the users by comparing the user's history of accesses to the time periods within the user's time zone to select applicable billing rates from among the billing rates. Then, the storage access service system computes a cost of access by summing a cost for each of said individual instances selected from said history of accesses multiplied by said applicable billing rates.

In another representative embodiment according to the present invention, one or more users agrees to access one or more of the logical device storage units at specific instances of the time periods in accordance with a preset schedule. The storage access service system determines charges for user access service based upon the one or more billing rates corresponding to the time periods in the preset schedule for the users. The storage access service system determines charges for user access service for the users by comparing the time periods in the preset schedule to the time periods within the time zone to select applicable billing rates from among the billing rates for the time periods within the time zone. Then, the storage access service system computes a cost of access by summing a cost for each of the time periods in the preset schedule multiplied by the applicable billing rate for the time period. Alternatively, in some specific embodiments, the applicable billing rate is multiplied by a fixed number of time periods within a billing cycle. These embodiments provide a "flat rate" billing model.

In a further representative embodiment according to the present invention, a method for managing access to storage resources is provided. The method comprises forming an agreement between access providers and users. The agreement comprises user information including an identity of a user; an identity of a resource, a time zone, and one or more billing rates for accessing the resource. Granting access to the resource based upon the identity of the user, the identity of the resource, and the time zone is also part of the method. The method also includes determining charges for accessing the resource based upon the identity of the user, the identity of the resource, and the billing rates.

In a specific embodiment, the method also includes logging individual instances of access to the resource into a history of accesses. The charges for a user are determined based upon the individual instances of access by the user of the resource, the time zone, and the billing rates by determining a usage time for each individual instance of access logged into the history of accesses. The billing rate corresponding to the usage time is determined from among the plurality of billing rates. A cost is computed by summing individual costs for each individual instance of access selected from the history of accesses. These individual costs are computed by multiplying the usage time by the billing rate corresponding to the usage time.

In a further specific embodiment, the billing rates correspond to one or more time periods for individual time zones. In this embodiment, determining a billing rate corresponding to the usage time from among plurality of billing rates comprises comparing individual instances of accesses logged into the history of accesses to the plurality of time periods in order to select a billing rate corresponding to the usage time from among the plurality of billing rates.

In a yet further specific embodiment, the user agrees to access the resource at a time period in accordance with a preset schedule. This type of service may be attractive for users who perform backups, or such background tasks, at a fixed time period and do not need access to the storage resources at other times. In these embodiments, the user is granted access to the resource within the time period in accordance with the preset schedule. The user is charged by selecting from among the plurality of billing rates a billing rate corresponding to the time period in the preset schedule, and then computing a cost of access by summing a cost for each individual instance of the time period within the preset schedule multiplied by the billing rate corresponding to the time period. Alternatively, the user's charges may be computed by computing a cost of access by multiplying the billing rate corresponding to the time period by a number of instances of the time period occurring in a billing cycle in the preset schedule.

In a yet further representative embodiment according to the present invention, a method for charging users for storage access in a disk subsystem is provided. The method comprises determining based upon a time zone of a location of a user one or more permitted access times, and one or more access rates. The access rates correspond to the permitted access times, and can vary for different user sites depending upon time zone. The method also includes contracting with the user to provide storage access based upon a capacity, the permitted access times, and the access rates. Tracking time periods when the user accesses storage in the disk system is performed, and then charges are determined for the time periods that the user is provided access. The charges are based upon the time zone of the location of the user, the permitted access times, and the access rates. Then a total cost is determined from the charges to the users for access.

In a still further representative embodiment according to the present invention, a method for charging users for storage access in a disk subsystem is provided. The method comprises determining based upon a time zone of a location of a user one or more permitted access times, and one or more access rates. The access rates correspond to the permitted access times. Contracting with the user to provide storage access based upon a capacity, the permitted access times, and the access rates is also part of the method. Further, the method includes permitting the user to accesses storage in the disk system at the permitted access times and determining for the permitted access times, charges to the user for access. The charge is based upon the time zone of a location of the user, the permitted access times, and the access rates. A total cost is determined from the charges to the users for access.

Numerous benefits are achieved by way of the present invention over conventional techniques. Specific embodiments according to the present invention enable SSPs to provide more flexible storage access services based on access time with their users. Further, in specific embodiments, users benefit from greater confidentiality afforded by the enhanced security restrictions preventing unauthorized access to data.

By virtue of specific embodiments according to the present invention, SSPs can introduce a price model based upon the time of access to SSP resources. For example, the SSPs can make the price of off-peak time cheaper than that of peak time. Some users would like to use the data connection at a lower cost, and are willing to accept limitations on the time of access to SSP resources. The SSPs are able to meet the needs of such clients, enabling the SSPs to provide access services to a larger number of clients.

Moreover, certain SSPs maintain points of presence (POP) all over the world. Such SSPs can introduce different price models for each of the different time zones throughout the world. When one SSP site is in a peak time, another SSP site in another time zone may be in an off-peak time. Thus, there exists the capability for SSPs to provide off-peak time access rates to SSP users during a peak time by shifting the access to another SSP site. The SSPs can be provided with the capability to increase client base all over the world.

In the users' point of view, they can choose the services based on their needs, and also enjoy the guarantee of the secure storage access.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 2 illustrates a representative LDEV access schedule management table in a specific embodiment according to the present invention.

FIG. 3 illustrates a representative LDEV access history table in a specific embodiment of the present invention.

FIG. 4 illustrates a representative price list table in a specific embodiment of the present invention.

DESCRIPTION OF THE SPECIFIC EMBODIMENTS

The present invention provides techniques for managing access to storage resources according to an access time. Specific embodiments provide a variety of different kinds of time based access billing. For example, in specific embodiments, one or more of a time time-card storage access service mode, a time-lock storage access service mode, and a semi-timecard storage access service mode are provided.

In a time time-card storage access service mode, the SSP provides the SSP users with an access service pricing model based upon the SSP users' time zone. The SSP users define the host system and LDEV. The SSP enters into an SLA with the SSP users based upon the SSP users' definition. Under the terms of the SLA, the SSP manages the host system access control when the SSP users desire access to the LDEV. The SSP accumulates an access history for the SSP users, and the SSP users pay for the storage access service usage based upon the access history in accordance with the SLA.

In a time-lock storage access service mode, the SSP provides the SSP users with an access service pricing model based upon the SSP users' time zone. The SSP users define the access time, host system and LDEV. The SSP enters into an SLA with the SSP users based upon the SSP users' definition. Under the terms of the SLA, the SSP manages the host system access control at the designated time automatically. The SSP users pay for the storage access service usage based upon the SLA.

In a semi-timecard storage access service mode, the SSP provides the time-lock storage access service with SSP users. If the SSP users desire to change the access schedule, then the SSP users notify the SSP of the change of the schedule. The SSP accumulates an access history for the SSP users. The SSP users pay for the storage access service usage based upon the access history in accordance with the SLA.

Figure 1:
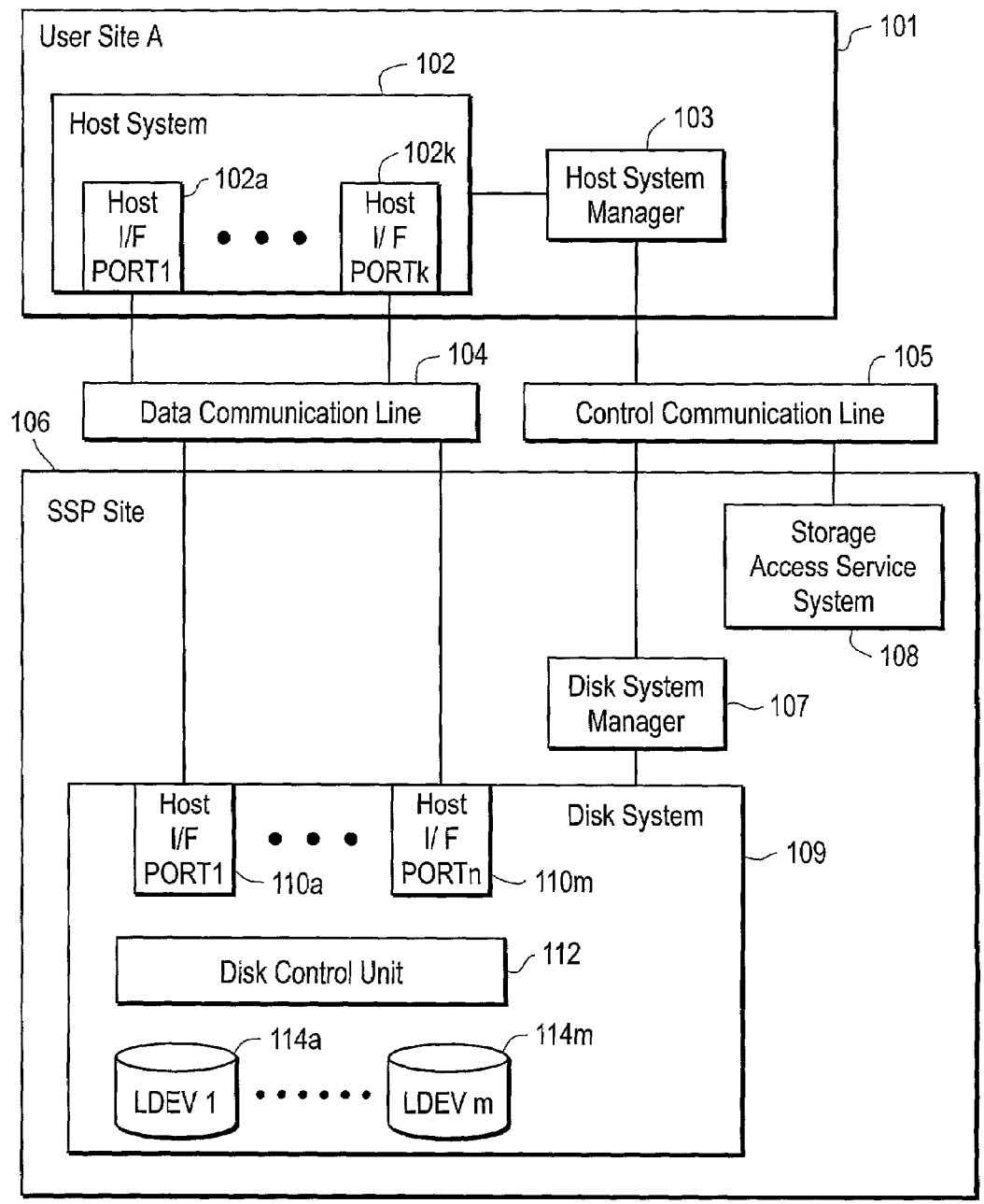
FIG. 1 illustrates a conceptual drawing of a representative system for providing storage access services in a specific embodiment of the present invention.

FIG. 1 illustrates a conceptual drawing of a representative system for providing storage access services in a specific embodiment of the present invention. In the representative embodiment depicted by FIG. 1, an SSP site 106 and a user site 101 are connected by a data communication line 104 and a control communication line 105. The user host site A, which is owned by an SSP user, may comprise one or more host systems. In the specific embodiment illustrated by FIG. 1, user host site (Site A) 101 comprises a host system 102 and a host system manager 103. A user may have one or more user host sites, which may be in the same location, for example, in the same building, or in separate locations. The number and location of user host sites may differ in various specific embodiments, thus the representative user host site A 101 is intended to be illustrative, rather than limiting.

In the representative embodiment illustrated by FIG. 1, the host site 101 comprises a single host system 102. However, in other embodiments, host site 101 may comprise two or more host systems. Host system 102 may be a server in the user host site 101, for example, which accesses a disk system in the SSP site according to the SLA between SSP and SSP user. Host system 102 comprises one or more host interface (I/F) ports, such as host interface ports 102a–102k in the embodiment illustrated by FIG. 1. The host interface ports provide a physical point for the data communication line 104 between the host system 102 and a disk system 109 at the SSP site 106. In a specific embodiment illustrated by FIG. 1, host system 102 comprises k host fibre channel interface ports labeled PORT1, . . . , PORTk. Each host interface port has a unique identifier ID, analogous to a world wide name (WWN) in the fibre channel protocol. In the specific embodiment illustrated by FIG. 1, the host ID comprises a world wide name. Host system 102 further comprises a host system manager 103. The host system manager 103 enables host system administrators to perform administrative and maintenance tasks on the host system 102. The host system manager 103 may be connected to a maintenance port on the host system 102, or may be connected to the host system 102 through a control communication line 105. If host systems have the capability of access control, the host system manager 103 can manage this capability.

Data communication line 104 serves as a data channel for data exchange between the host system 102 and the disk system 109. In this embodiment, data communication line 104 is a fibre channel connection. However in other specific embodiments, data communication line 104 can be any of a variety of communication links. Thus, the discussion of fibre channel protocol is for illustrative purposes only.

Control communication line 105 serves as a data channel for control message exchange among host systems, such as host system 102 and disk systems, such as disk system 109. In specific embodiments, control communication line 105 may interface through one or more of host system manager 103, disk system manager 107, and storage access service system 108. In specific embodiments, control communication line 105 can be any of a variety of communication links.

The SSP site 106 comprises one or more disk systems, such as disk system 109, which are owned and managed by the SSP. In the specific embodiment illustrated by FIG. 1, a single SSP site is depicted. However, in many specific embodiments, an SSP has two or more SSP sites, which may be in the same location, such as for example, in the same building, or, in alternative embodiments, the SSP's sites are in separate locations. Accordingly, the number and location of SSP sites necessarily differs in specific embodiments, and the specific embodiment illustrated by FIG. 1 is intended to be merely illustrative and not limiting of the present invention. The SSP site 106 comprises a disk system manager 107, which enables disk system administrators to perform administrative and maintenance tasks on the disk system 109. In specific embodiments, the disk system manager 107 may be connected to a maintenance port of the disk system 109, or alternatively, may be connected to the disk system 109 through a control communication line 105. If host systems have the capability of access control, the disk system manager 107 manages this capability.

The SSP site 106 further comprises a storage access service system 108. The access service system 108 manages and performs storage access services described herein for the host system 102 and the disk system 109. The SSP site 106 comprises one or more disk systems, such as disk system 109. In the representative embodiment illustrated by FIG. 1, a single disk system 109 is depicted in the SPP site 106. However, in various specific embodiments, two or more disk systems may be present. The disk system 109 comprises one or more disk interface (I/F) ports 110a–110n, a disk controller unit 112, and one or more logical devices (LDEVs) 114a–114m. The disk interface ports 110a–110n provide physical connection of the disk system 109 to host systems, such as host system 102. Disk system administrators assign various ports to certain host systems.

In the embodiment illustrated by FIG. 1, there are n disk interface ports, labeled PORT1, . . . , PORTn, in the disk system 109. The disk controller unit 112 performs data transfer between host systems and LDEVs within the disk system 109. The logical devices (LDEVs) 114a–114m are logical volumes residing on physical disk hardware of the disk system 109. The LDEVs may be assigned to certain host systems using commands that will be described in further detail herein below. In a specific embodiment, the LDEV is comprised of one physical disk drive, however, in other specific embodiments, several physical disk drives may use a Redundant Array of Inexpensive Disks (RAID) configuration in order to provide greater availability and reliability. In the embodiment illustrated by FIG. 1, there are m LDEVs, labeled LDEV1, . . . , LDEVm, comprising disk system 109.

FIGS. 2 through 4 illustrate representative data tables used in various specific embodiments according to the present invention.

FIG. 2 illustrates a representative LDEV access schedule management table in a specific embodiment of the present invention. FIG. 2 illustrates table 200 which resides in the storage access service system 108. Table 200 comprises a plurality of entries in accordance with a storage access service description based upon the SLA between the SSP and the SSP users. Entries in the table 200 comprise a plurality of attributes. A user site attribute 202 provides user identification. A host port ID attribute 204 provides the host port ID, which is the parameter used for controlling access to the disk system. In a specific embodiment that employs a fibre channel protocol for exchanging information between the SSP and the host computers of the users, the world wide name (WWN) of the host I/F port may be used as the host port ID. An LDEV ID attribute 206 is another attribute that is used for controlling access to the disk system 109. In the specific embodiment illustrated by FIGS. 1 and 2, individual LDEVs 114a–114m within the disk system 109 are each assigned a unique number, which is used as the LDEV ID attribute 206. A time zone attribute 208 indicates the time zone at the location of the user site 101. If the pricing model of the storage access service is different for each time zone, as described herein below with reference to FIG. 4, the time zone attribute 208 is used to compute a price for storage access services in a billing procedure as described herein below with reference to FIGS. 13 and 16. An access schedule 210 illustrates the access schedule defined in the SLA. The value of this attribute is used in a start access and an end access procedure described herein below with reference to FIGS. 8 and 9.

FIG. 3 illustrates a representative LDEV access history table in a specific embodiment of the present invention. FIG. 3 illustrates LDEV access history table 300 which resides in the storage access service system 108. The LDEV access history table 300 comprises a plurality of entries in accordance with the access history of each host system. Entries in the LDEV access history table 300 comprise a plurality of attributes. A user site attribute 302 provides user site identification. A host port ID attribute 304 provides the host port ID. The host port ID is the parameter used for controlling access to the disk system 109. In a specific embodiment that employs a fibre channel protocol for exchanging information between the SSP and the host computers of the users, the world wide name (WWN) of the host I/F port may be used as the host port ID. An LDEV ID attribute 306 is another attribute that is used for controlling access to individual LDEVs within the disk system 109. In a specific embodiment, the disk system 109 is assigned a unique number, which is used as the LDEV ID attribute 306. A start time 308 comprises a date and a time that access began for each entry in LDEV access history table 300. An end time 310 comprises a date and a time that access terminated for each entry in the LDEV access history table 300. The start time 308 and end time 310 attributes show the actual usage of the storage access service. If a storage access service system 108 receives the start access or end access message from users, the storage access service system 108 updates these fields.

FIG. 4 illustrates a representative price list table in a specific embodiment of the present invention. FIG. 4 illustrates price list table 400 which resides in the storage access service system 108. The price list table 400 comprises a plurality of entries in accordance with the price list for accessing the disk system 109 from host systems in various time zones. The entries in price list table 400 are used in a billing procedure described herein below with reference to FIGS. 13 and 16. Entries in the price list table 400 comprise a plurality of attributes. A time zone attribute 402 indicates the time zone for the entry. In a specific embodiment, price list table 400 includes an entry for each time zone in the world. As used herein, the notation "GMT+3" indicates an area having a time zone that is three (3) hours ahead of that of Greenwich Mean Time (GMT). A time and price list for storage access service section 404 of the price list table 400 comprises a price chart for storage access services for each of the time zones in the entry. The details of the price information stored in the time and price list for storage access service section 404 depend on the pricing model employed by the SSP in the SLAs between the SSP and the SSP users. Thus, the details of the price list illustrated in FIG. 4 are merely illustrative of one particular pricing model in a specific embodiment, and are not intended to be limiting. The attributes in the time and price list for storage access service section 404 are used in a billing procedure in order to calculate the price of the access service.

FIGS. 5 through 16 illustrate flowcharts of representative processing used in various specific embodiments according to the present invention. FIGS. 6 through 16 illustrate flowcharts of representative detail processing of the procedures described with reference to FIG. 5. In the sequence diagrams of FIGS. 6 through 16, the activities and events among a plurality of entities, including the SSP users' host system 102, the SSP's site 106, the disk system manager 107 or host system manager 103, and the storage access service system 108 are illustrated according to the passage of time. The vertical axis represents time, while each box on the vertical lines represents the activities and events, and the horizontal arrows indicate messages exchanged between the actors.

Figure 5:
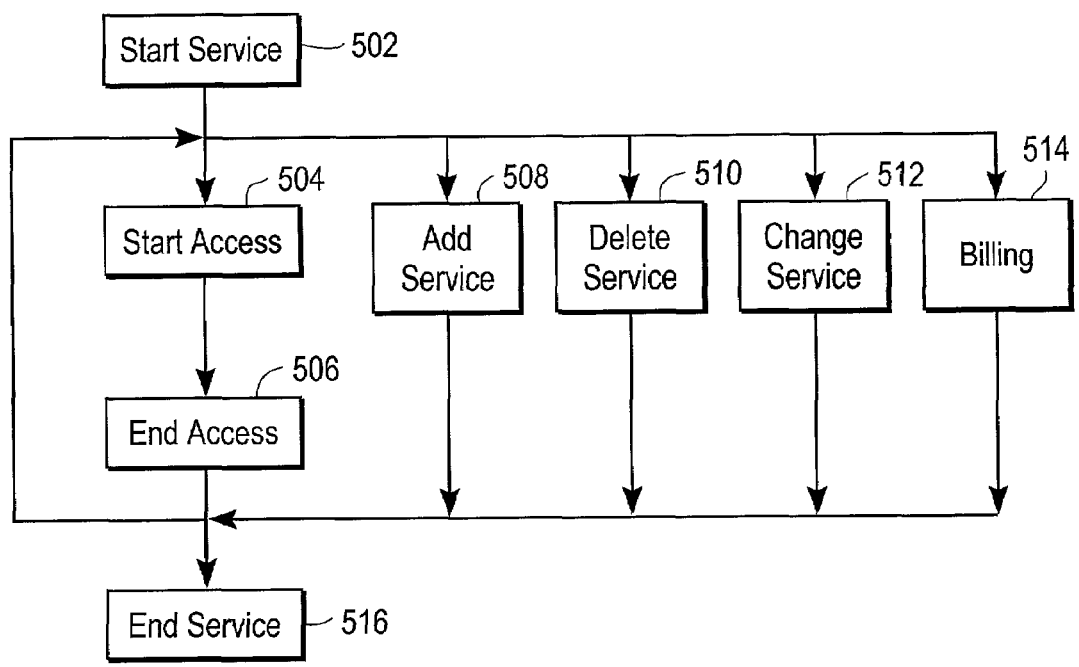
FIG. 5 illustrates a flowchart of representative time access storage service processing in a specific embodiment of the present invention.

FIG. 5 illustrates a flowchart of representative time access storage service processing in a specific embodiment of the present invention. As illustrated by FIG. 5, the SSP users and the SSP enter into a SLA in a start service procedure 502. During the term of the SLA, the SSP users can access one or more LDEVs according to a start access procedure 504 and an end access procedure 506. The SSP users are also permitted to add, delete, or change the service according to an add service 508, a delete service 510, and a change service 512 procedures. The SSP bills the SSP user based on an access history according to a billing procedure 514. If the SSP users decide to cancel the SLA, the SSP and the SSP users follow an end service procedure 516.

Figure 6:
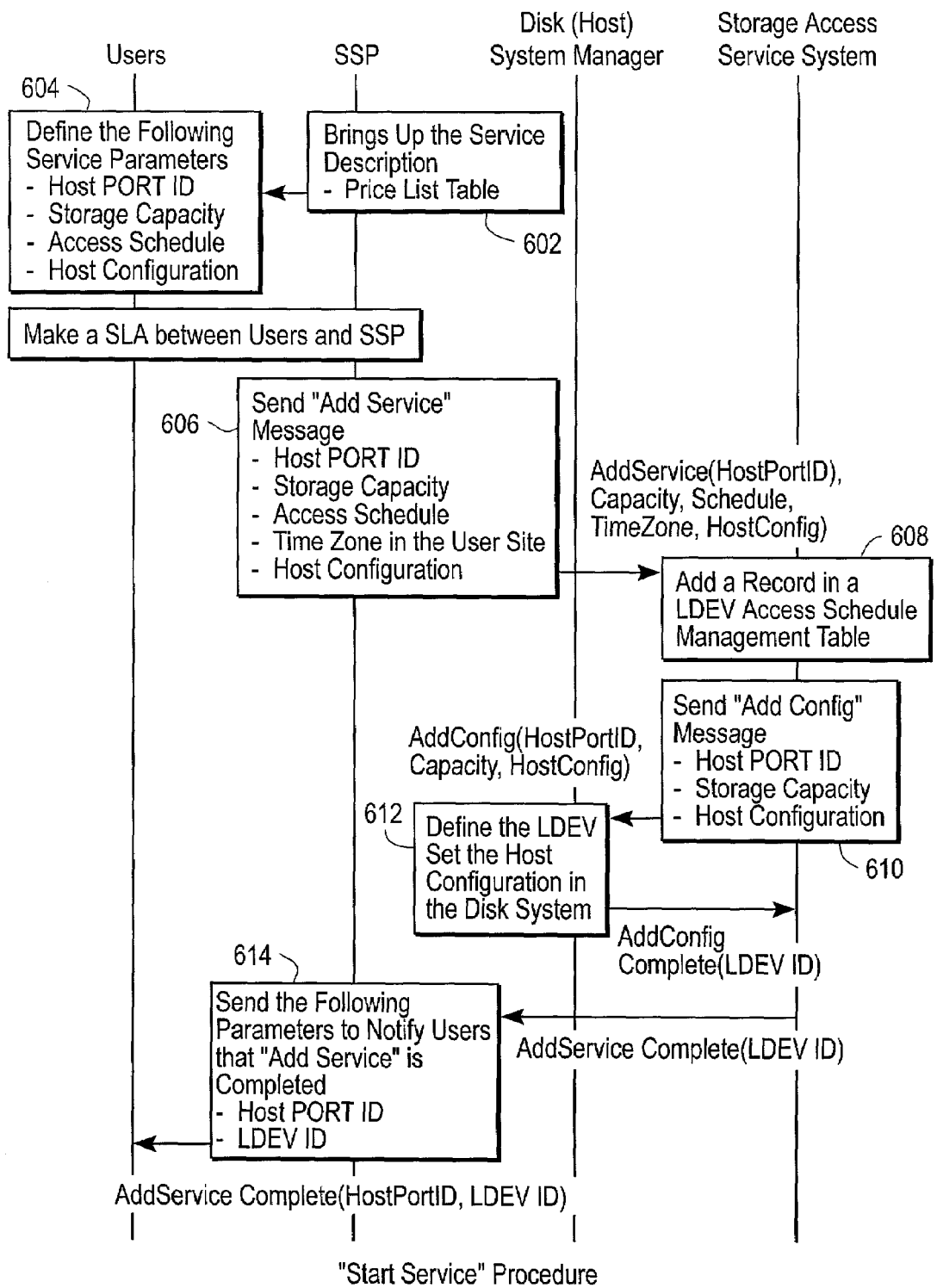
FIG. 6 illustrates a flowchart of a representative start service processing in a specific embodiment of the present invention.

FIG. 6 illustrates a flowchart of a representative start service processing in a specific embodiment of the present invention. In start service processing, the SSP users and the SSP enter into a SLA in a start service procedure. In this procedure, SSP users sign a service contract with the SSP and the SSP builds an appropriate configuration in the disk system 109. As illustrated by FIG. 6, in a step 602, the SSP provides a service description. Based upon the service description, the SSP and the SSP users enter into a SLA in a step 604. In the SLA, a set of parameters such as the host port ID, a storage capacity, an access schedule, and a host configuration(s) are defined in order to begin the service. In a specific embodiment, the host configuration comprises an SCSI ID and a logical unit number (LUN) for the host I/F port. The disk system manager 107 can define the LDEV and specify the parameters of the host configuration to the disk system. After the service agreement has been reached, the SSP sends an add service message to the storage access service system 108 in a step 606. The message comprises the parameter set described above with reference to step 604. Then, in a step 608, the storage access service system 108 adds a record having the parameters sent to it in the add service message into the LDEV access schedule management table 200. In a step 610, the storage access service system 108 issues an add config message to the disk system manager 107 in order to instruct the disk system manager 107 to build an LDEV configuration in the disk system 109. The add config message comprises a host port ID, a storage capacity, and a host configuration. The disk system manager 107 builds the LDEV, in a step 612. Then, in a step 614, the SSP returns an add service complete message to the SSP users. The add service complete message includes the host port ID and the LDEV ID.

Figure 7:
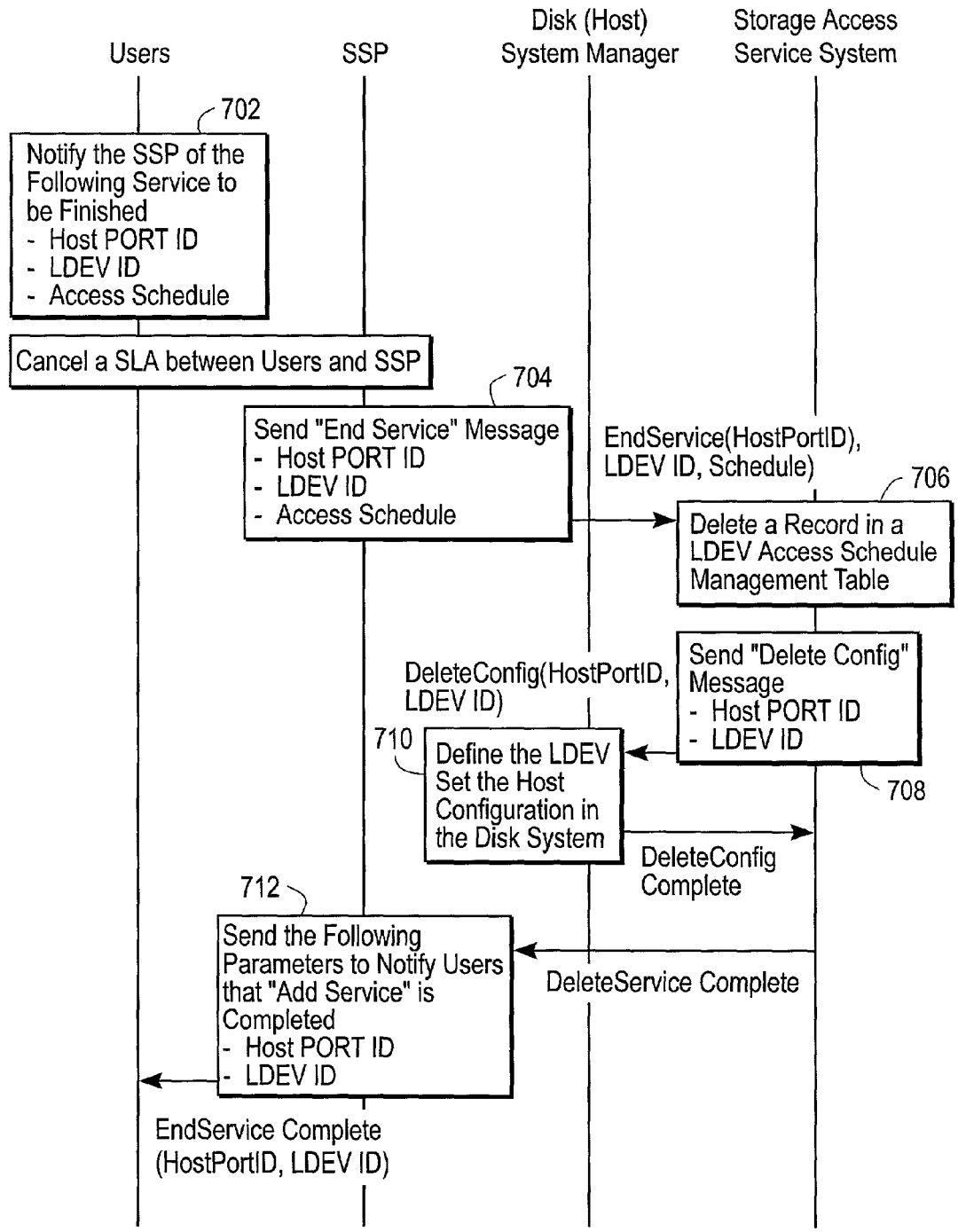
FIG. 7 illustrates a flowchart of a representative end service processing in a specific embodiment of the present invention.

FIG. 7 illustrates a flowchart of a representative end service processing in a specific embodiment of the present invention. In end service processing, the SSP users cancel a service contract with the SSP and the SSP frees the configuration in the disk system 109. As illustrated by FIG. 7, in a step 702, the SSP users notify the SSP that the SSP users desire to cancel the SLA. In this notification, a plurality of parameters, comprising a host port ID, an LDEV ID, and an access schedule are included in the cancellation notice. After receiving notification from the SSP users that the SSP users intend to cancel the SLA, the SSP sends an end service message to the storage access service system 108 in a step 704. The end service message includes the parameters described above with reference to step 702. Then, in a step 706, the storage access service system 108 deletes the entries in the LDEV access schedule management table 200 that correspond to the parameters in the end service message. Next, in a step 708, the storage access service system 108 issues a delete config message to the disk system manager 107. Responsive to the delete config message, the disk system manager 107 frees the designated LDEV configuration in the disk system 109 in a step 710. After deleting the LDEV configuration, the SSP notifies the SSP users by sending an end service complete message in a step 712. The end service complete message includes the host port ID and the LDEV ID.

Figure 8:
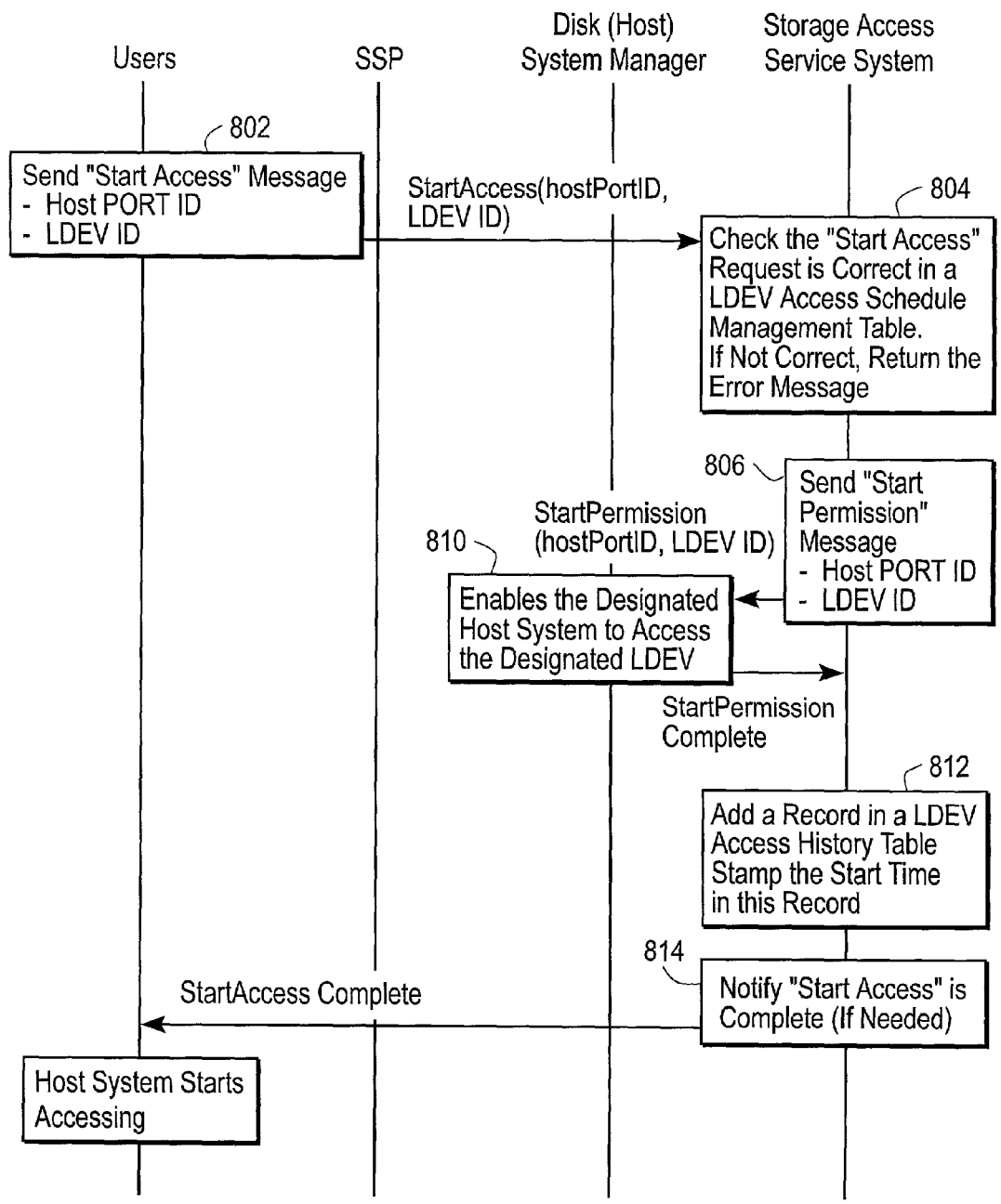
FIG. 8 illustrates a flowchart of a representative start access processing in a specific embodiment of the present invention.

FIG. 8 illustrates a flowchart of a representative start access processing in a specific embodiment of the present invention. In start access processing, the SSP users request access to the designated LDEV, and the SSP enables the host system 102 in the user site to access the LDEV. As illustrated by FIG. 8, in a step 802, the SSP users send a start access message to the storage access service system 108 in order to start the host access to the LDEV. After receiving the start access message, the storage access service system 108 checks if the user is authorized to access the requested LDEV by comparing the host port ID and LDEV ID in the start access message with the information for the SSP user in the LDEV access schedule management table 200 in a step 804. If the start access request is valid, then the storage access service system 108 sends a start permission message to the disk host system manager 107 in a step 806. Responsive to receiving the start permission message, the disk system manager 107 enables the host system 102 in the user site to access the requested LDEV in a step 810. Next, in a step 812, the storage access service system 108 adds an entry in the LDEV access history table 300 and enters information in the entry for the start time for access for the LDEV. In a step 814, the storage access service system 108 notifies the SSP users that start access processing is complete. Then, the host system 102 at the user site is permitted to access the LDEV.

Figure 9:
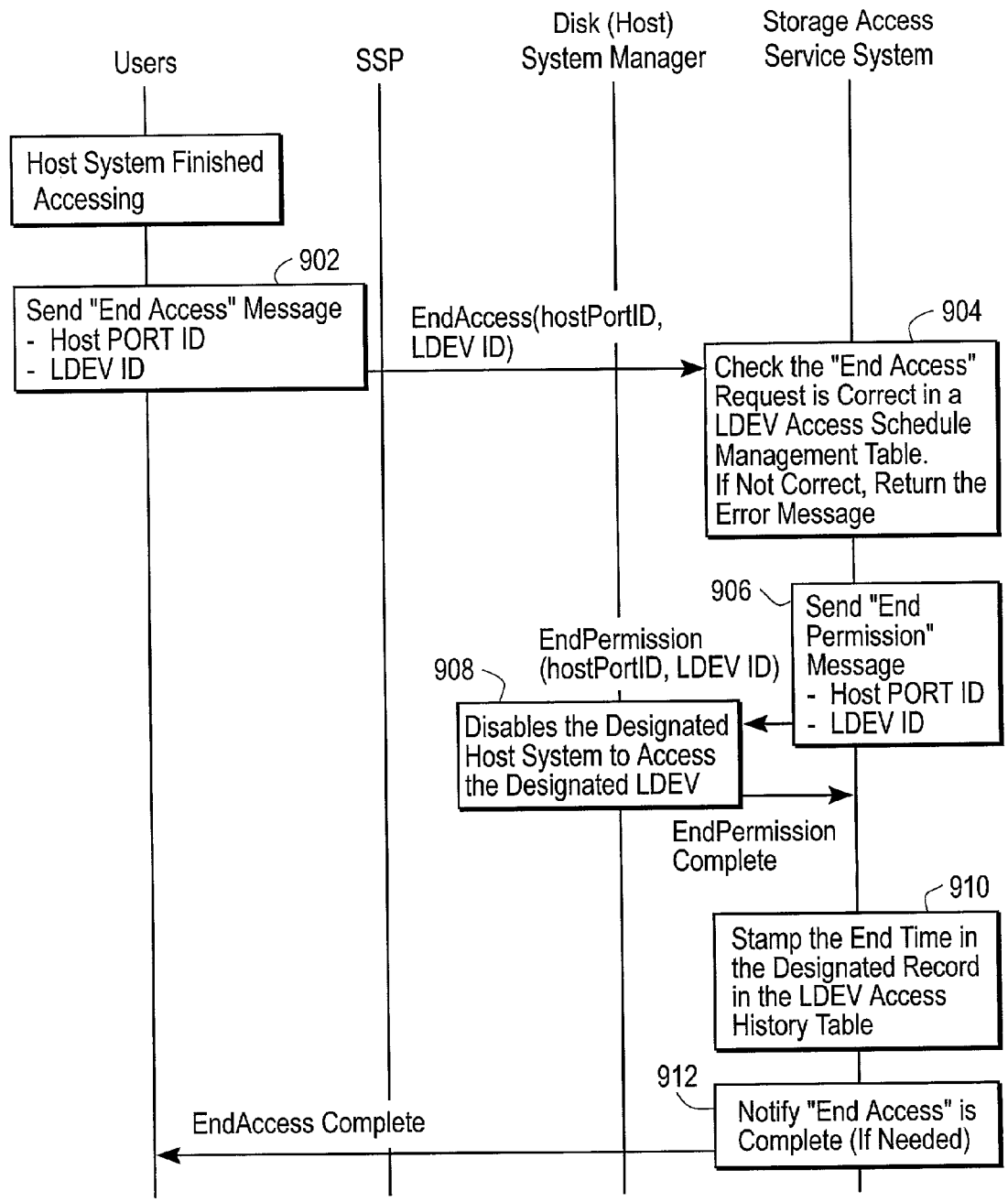
FIG. 9 illustrates a flowchart of a representative end access processing in a specific embodiment of the present invention.

FIG. 9 illustrates a flowchart of a representative end access processing in a specific embodiment of the present invention. In end access processing, the SSP users notify the storage access service system 108 of the completion of the accessing of the requested LDEV. The SSP terminates the capability of the host system 102 to access the LDEV further. As illustrated by FIG. 9, in a step 902, the SSP users send an end access message to the storage access service system 108 in order to notify the storage access service system 108 that the host system 102 has completed accessing of the LDEV. After receiving the end access message, the storage access service system 108 checks if the user is authorized to end access of the LDEV by comparing the host port ID and LDEV ID in the end access message with the information for the SSP user in the LDEV access schedule management table 200 in a step 904. If the end access request is valid, then the storage access service system 108 sends an end permission message to the disk host system manager 107 in a step 906. Responsive to receiving the end permission message, the disk system manager 107 terminates the ability of the host system 102 in the user site to access the designated LDEV in a step 908. In a step 910, the storage access service system 108 adds a time entry for the end time of the access into the corresponding entry for the LDEV in the LDEV access history table 300. Then, in a step 912, the storage access service system notifies the SSP users that end access processing has been completed. And then, the host system 102 in the user site will no longer be able to access the LDEV.

Figure 10:
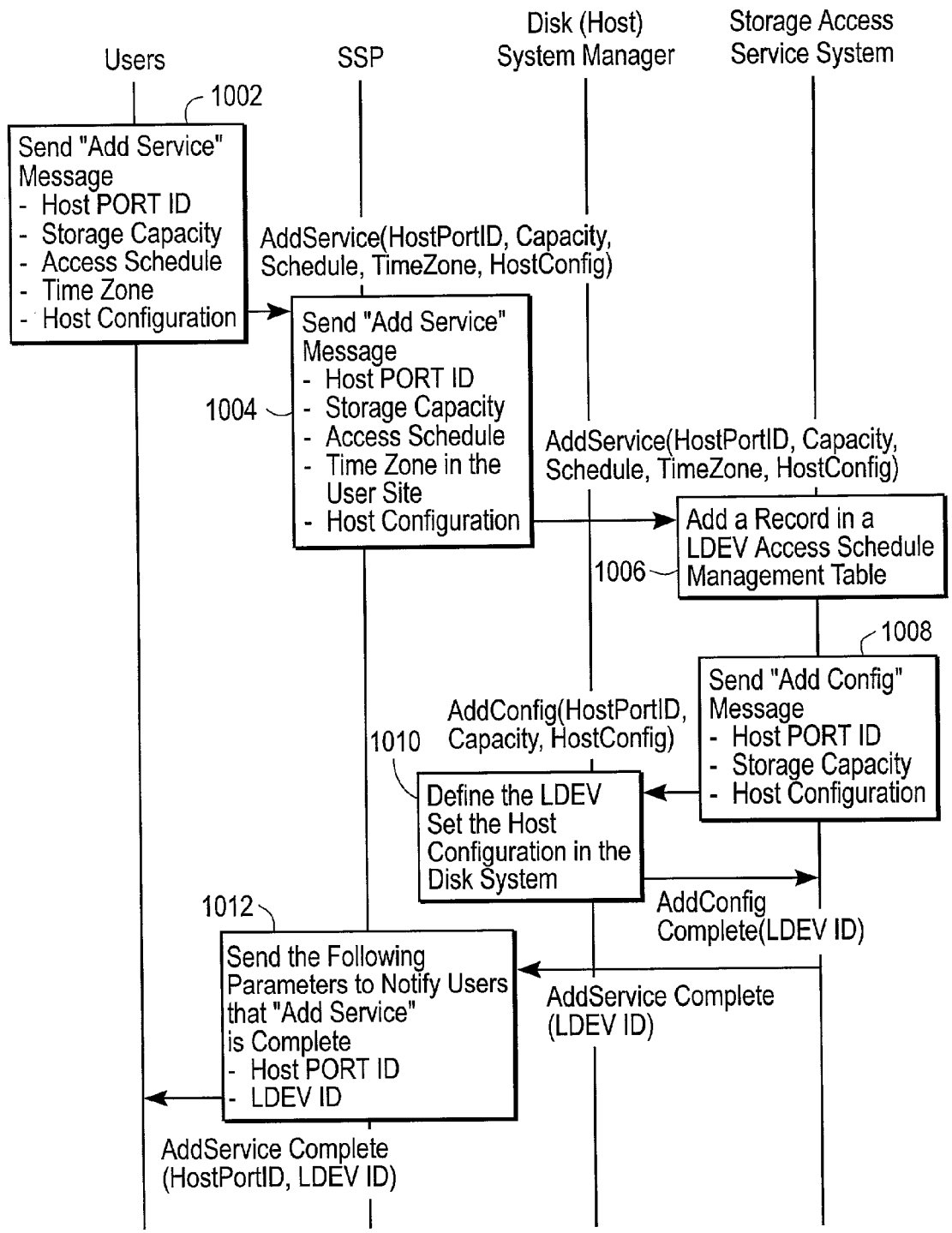
FIG. 10 illustrates a flowchart of a representative add service processing in a specific embodiment of the present invention.

FIG. 10 illustrates a flowchart of a representative add service processing in a specific embodiment of the present invention. In add service processing, an SLA is already in place between the SSP users and the SSP. However, the SSP users request that the SSP add certain access services, and the SSP builds the additional configuration in the disk system 109. As illustrated by FIG. 10, in a step 1002, the SSP users make a request for an additional service using an add service message. In the add service message, a set of parameters such as a host port ID, a storage capacity, an access schedule, and a host configuration(s) that describe the new service are provided. Then, in a step 1004, the SSP sends an add service message to the storage access service system 108 with the parameter set described above with reference to step 1002. Then, in a step 1006, the storage access service system 108 adds a record having the parameters sent to it in the add service message into the LDEV access schedule management table 200. In a step 1008, the storage access service system 108 issues an add config message to the disk system manager 107. The add config message comprises a host port ID, a storage capacity, and a host configuration. Responsive to the add config message, the disk system manager 107 builds an LDEV configuration in the disk system 109 in a step 1010. After building the LDEV, the SSP returns an add service complete message to the SSP users in a step 1012. The add service complete message includes the host port ID and the LDEV ID.

Figure 11:
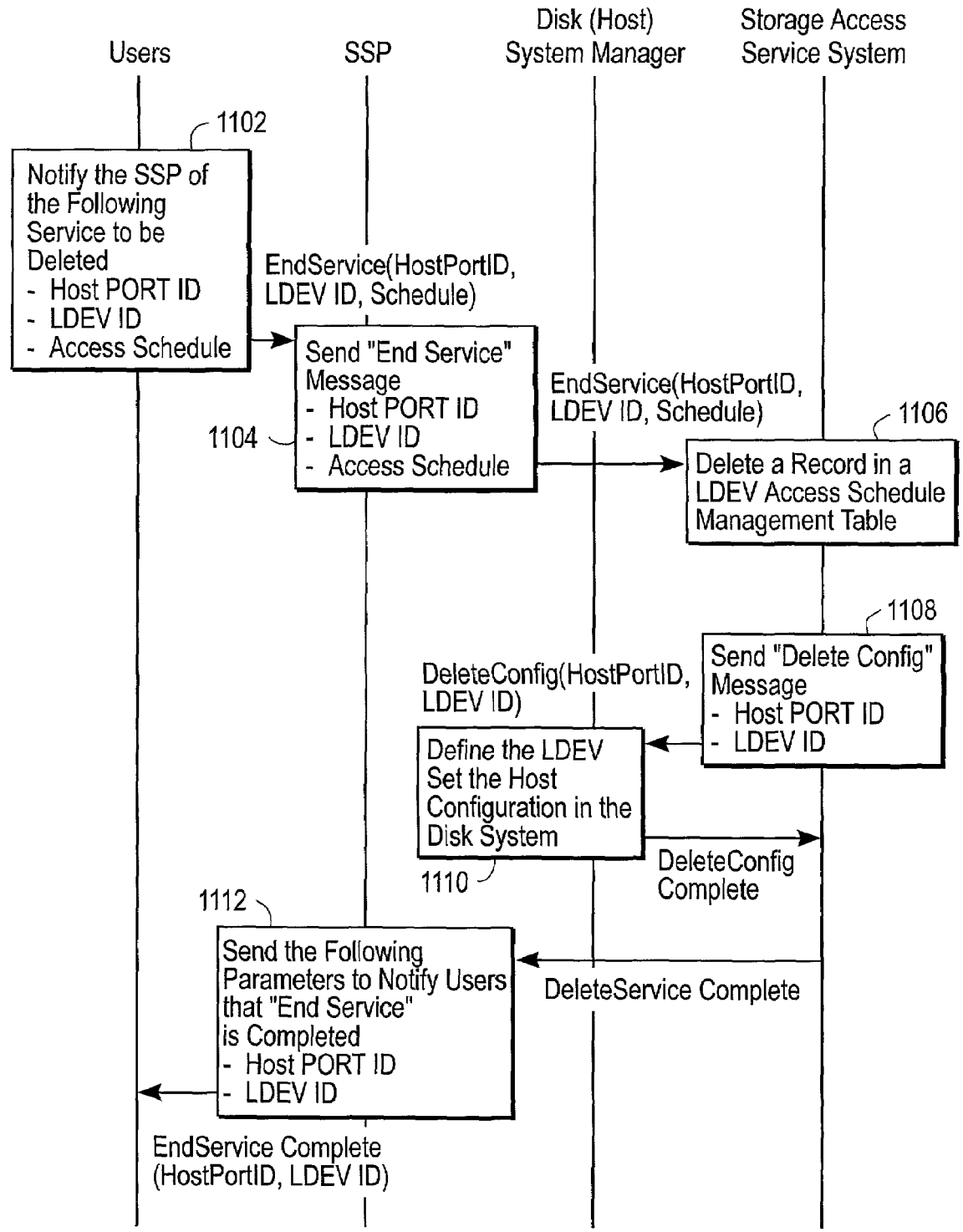
FIG. 11 illustrates a flowchart of a representative delete service processing in a specific embodiment of the present invention.

FIG. 11 illustrates a flowchart of a representative delete service processing in a specific embodiment of the present invention. In delete service processing, SSP users request that the SSP delete certain existing access services, and the SSP frees the designated configuration in the disk system 109. As illustrated by FIG. 11, in a step 1102, the SSP users notify the SSP that the SSP users desire to cancel access to specific resources. In this notification, a plurality of parameters, comprising a host port ID, an LDEV ID, and an access schedule are included in the delete service notice. Then, in a step 1104, the SSP sends an end service message to the storage access service system 108. The end service message includes the parameters described above with reference to step 1102. Then, in a step 1106, the storage access service system 108 deletes the entries in the LDEV access schedule management table 200 that correspond to the parameters in the end service message. Next, in a step 1108, the storage access service system 108 issues a delete config message to the disk system manager 107. Responsive to the delete config message, the disk system manager 107 frees the designated LDEV configuration in the disk system 109 in a step 1110. After canceling the LDEV configuration, in a step 1112, the SSP notifies the SSP users by sending an end service complete message. The end service complete message includes the host port ID and the LDEV ID.

Figure 12:
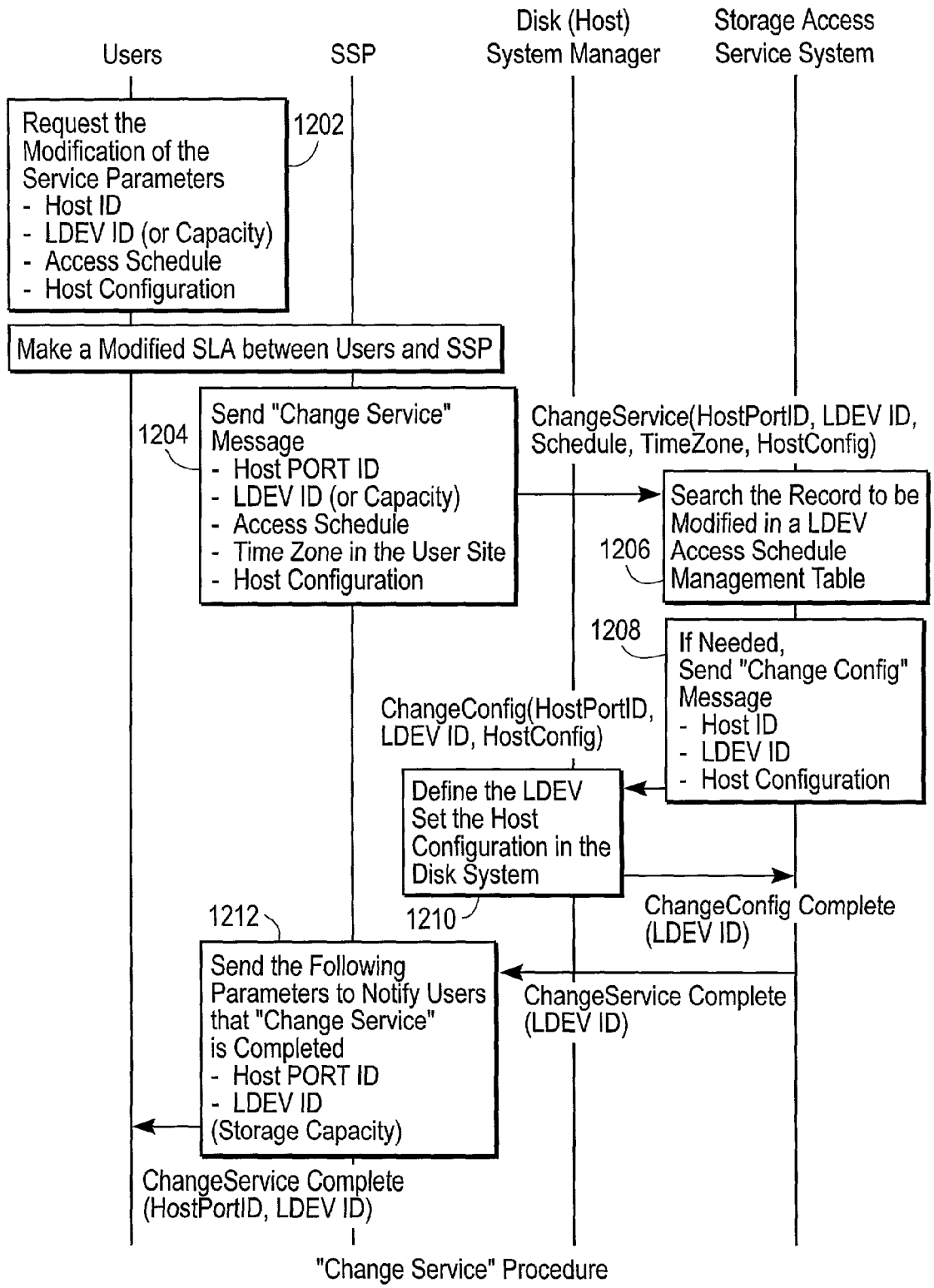
FIG. 12 illustrates a flowchart of a representative change access processing in a specific embodiment of the present invention.

FIG. 12 illustrates a flowchart of a representative change access processing in a specific embodiment of the present invention. In change access processing, the SSP users request a change to the existing access services, and the SSP changes the designated configuration in the disk system 109. As illustrated by FIG. 12, in a step 1202, the, SSP users notify the SSP that the SSP users desire a change to the SLA. In this notification, a plurality of parameters, comprising a host port ID, an LDEV ID, and an access schedule that includes the desired modification are included in the change request notification. After changing the SLA, the SSP sends a change service message to the storage access service system 108 in a step 1204. The change service message includes the parameter set described in step 1202 with reference to the change request notification. Then, in a step 1206, the storage access service system 108 changes an entry corresponding to the access being changed in the LDEV access schedule management table 200. Next, in a step 1208, the storage access service system 108 issues a change config message to the disk system manager 107. The disk system manager 107 changes the designated LDEV configuration in the disk system 109 in a step 1210. After changing the LDEV configuration, the SSP notifies the SSP users of the completion of the change request in a step 1212.

Figure 13:
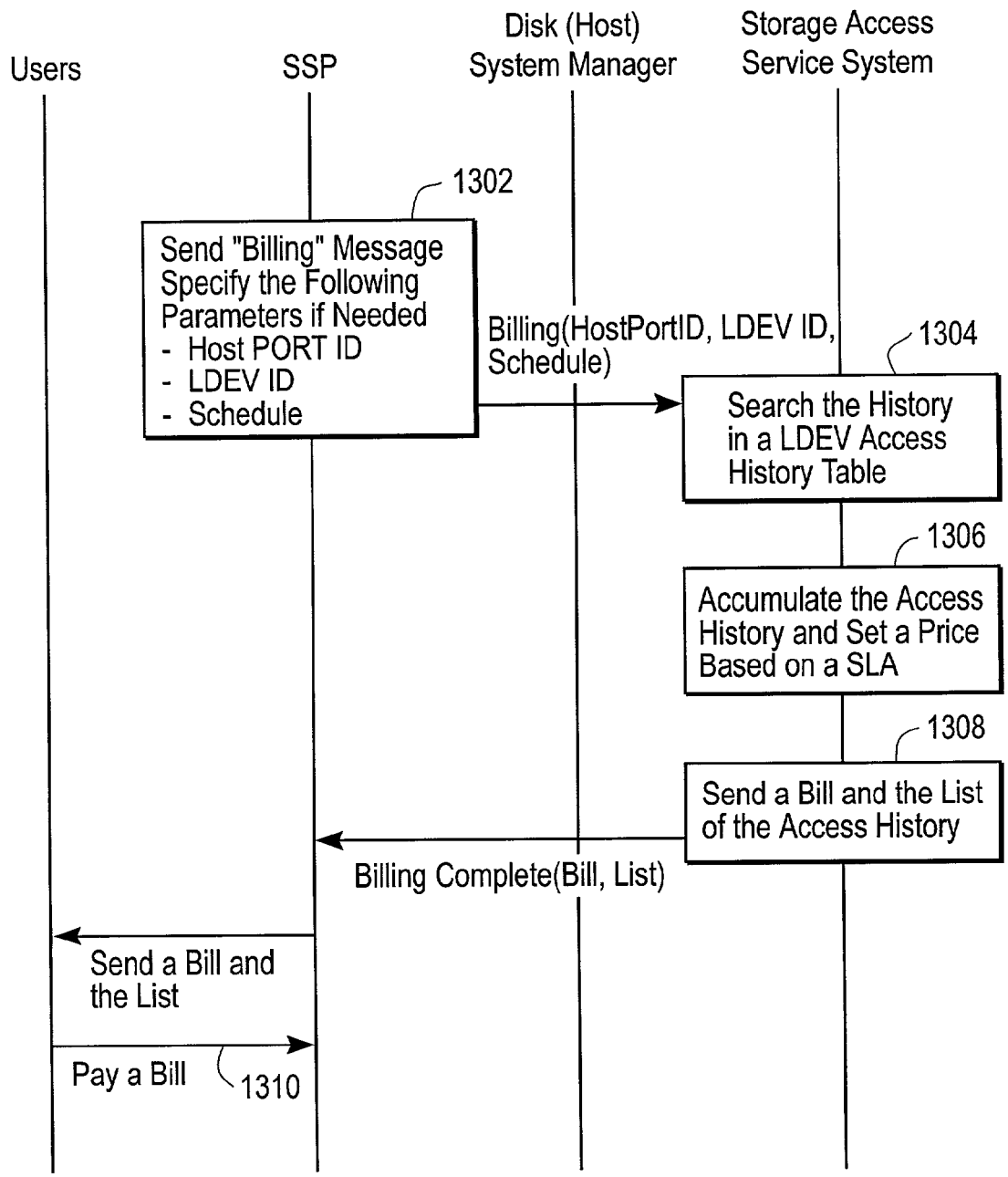
FIG. 13 illustrates a flowchart of a representative variable billing processing in a specific embodiment of the present invention.

FIG. 13 illustrates a flowchart of a representative variable billing processing in a specific embodiment of the present invention. In variable billing processing, the SSP prepares a bill according to the access history and sends the bill to the SSP users. As illustrated by FIG. 13, in a step 1302, the SSP sends a billing message to the storage access service system 108 in order to initiate the billing processing. If the SSP requires a bill for a specific SSP user, then the billing message includes a plurality of parameters, such as a host port ID, an LDEV ID, and an access schedule. Then, in a step 1304, the storage access service system 108 searches the access history for the designated host port ID and LDEV ID in the LDEV access history table 300, and retrieves access history information used to determine the cost of the service. Next, in a step 1306, the storage access service system 108 determines the cost of the service by accumulating the cost of each access in the access history information at the price and terms agreed upon by the SSP and the SSP user in the SLA. Then, in a step 1308, the storage access service system 108 sends the bill and the access history to the SSP. The SSP forwards the bill and access history to the SSP user. In an alternative embodiment, the storage access service system 108 sends these items directly to the SSP users. In a step 1310, the users forward payment to the SSP.

In another embodiment according to the present invention, a time-lock storage access service is provided. This embodiment will now be described with respect to FIGS. 14 and 15. In the time-lock storage access service mode, the storage access service system 108 begins and ends controlling storage access automatically. This mode of operation is especially useful in embodiments in which the users have a fixed amount of work which starts and ends at a specified time.

Figure 14:
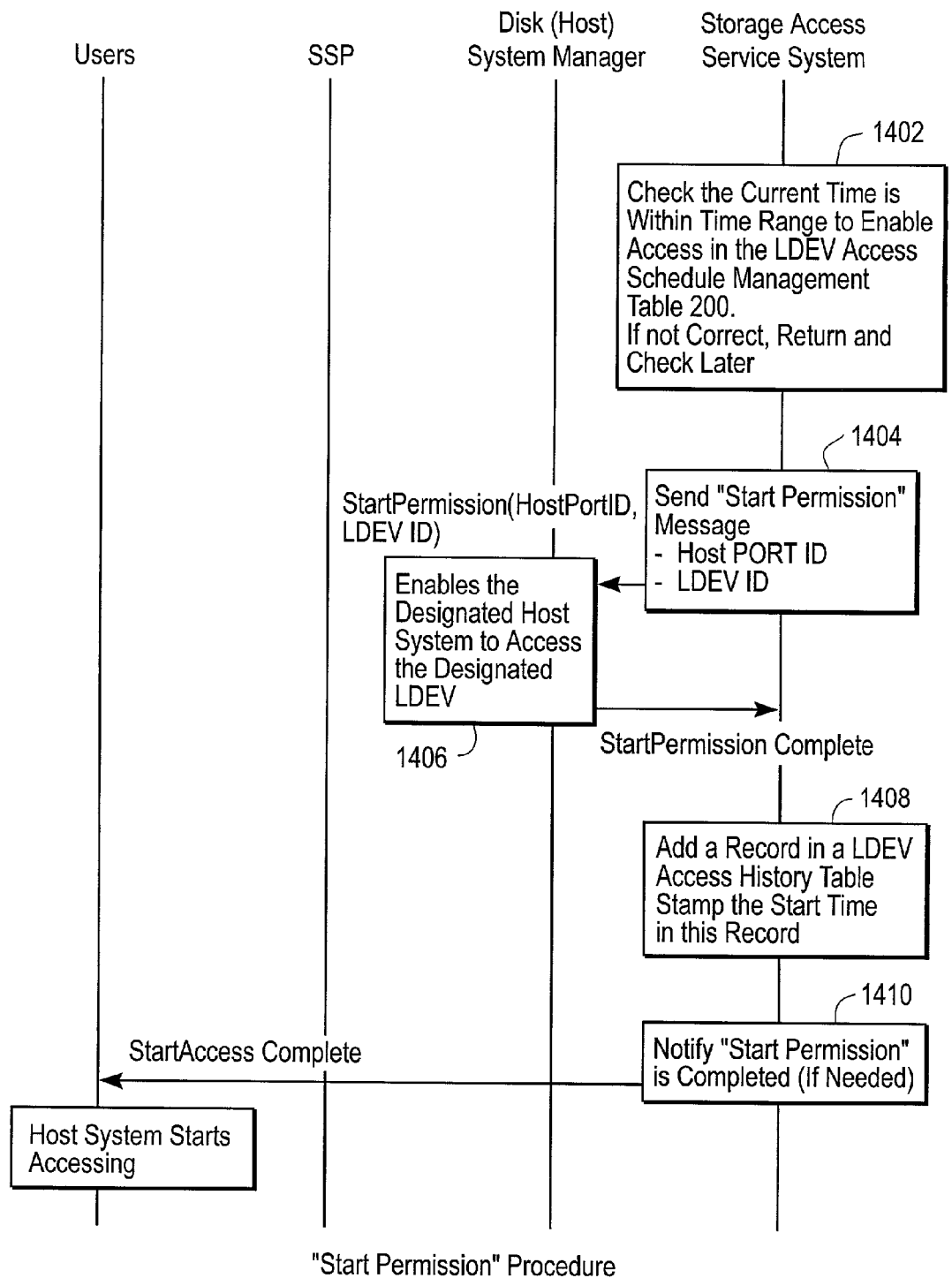
FIG. 14 illustrates a flowchart of a representative start permission processing in a specific embodiment of the present invention.

FIG. 14 illustrates a flowchart of a representative start permission processing in a specific embodiment of the present invention. As illustrated by FIG. 14, in a step 1402, the storage access service system 108 determines if the current time is within the range defined by the values of the start time and end time in the access schedule attribute of the appropriate entry for the SSP user in the LDEV access schedule management table 200. If so, in a step 1404, the storage access service system 108 sends a start permission message to the disk system manager 107. Then, in a step 1406, the disk system manager 107 enables the host system 102 to access the LDEV in the disk subsystem 109 during the period defined in the access schedule attribute in the LDEV access schedule management table 200 in accordance with the SLA. During this time, the disk system 109 will accept the I/O requests from the host system 102. In an optional step 1408, an entry may be added in the LDEV access history table 300. This entry includes a start time for access permission. The start time can be recorded in the history table to provide evidence of the start of access permission. In another optional step 1410, a start permission complete message is sent to host system 102 to indicate that this host system now has access permission to the appropriate LDEV in the disk subsystem 109.

Figure 15:
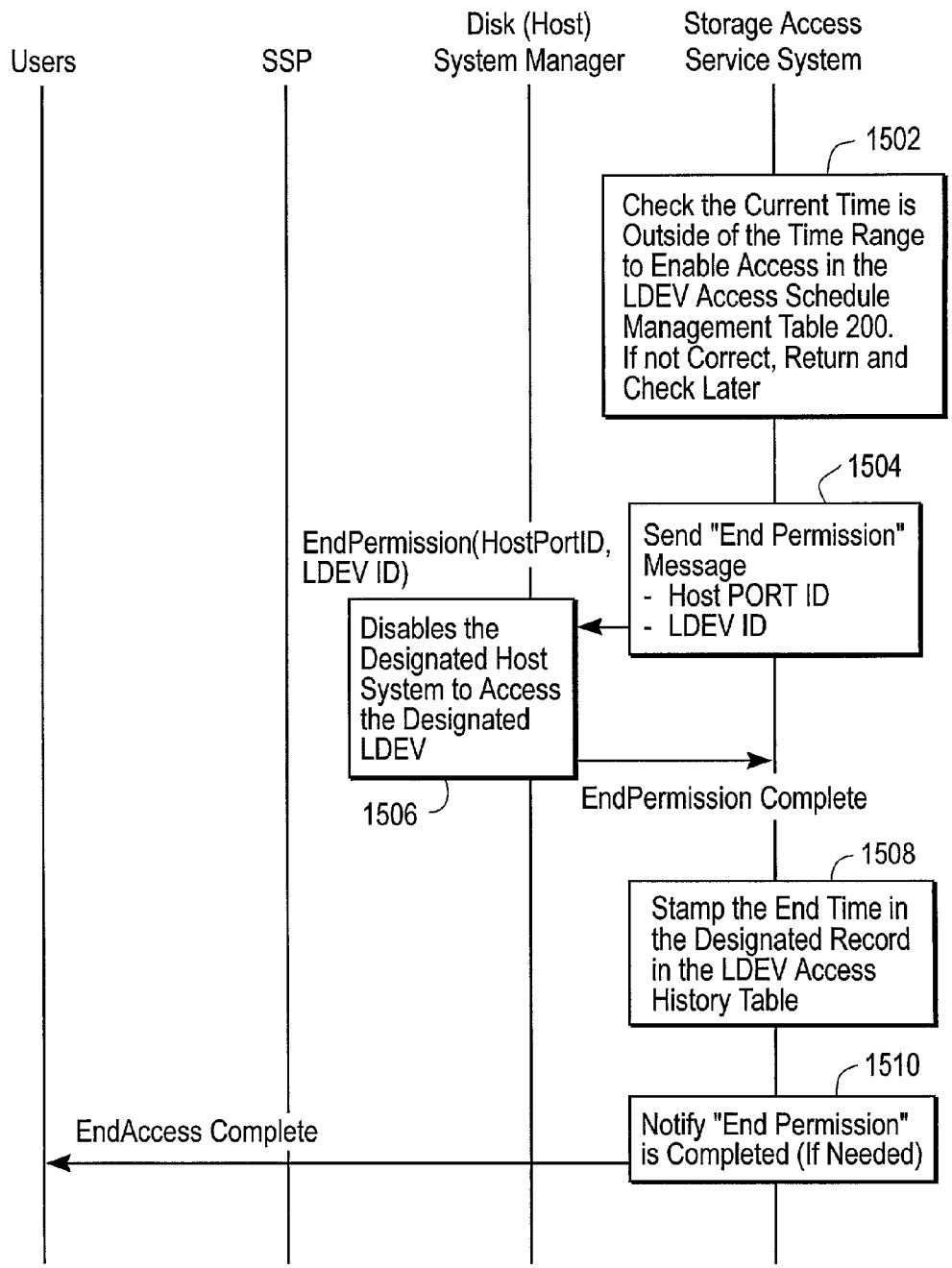
FIG. 15 illustrates a flowchart of a representative end permission processing in a specific embodiment of the present invention.

FIG. 15 illustrates a flowchart of a representative end permission processing in a specific embodiment of the present invention. As illustrated by FIG. 15, in a step 1502, the storage access service system 108 determines if the time period for permitted access for the SSP user has passed by comparing the current time to the range defined by the values of the start time and end time in the access schedule attribute of the appropriate entry for the SSP user in the LDEV access schedule management table 200. If so, in a step 1504, the storage access service system 108 sends an end permission message to the disk system manager 107. Then, in a step 1506, the disk system manager 107 blocks the host system 102 from further accessing the LDEV in the disk subsystem 109. If the host system 102 attempts to access an LDEV beyond the period defined in the access schedule an attribute in the LDEV access schedule management table 200, the disk system 109 does not accept the I/O request, and an access error is returned to the host system 102. In an optional step 1508, an entry may be added in the LDEV access history table 300. This entry includes an end time for access permission. The end time can be recorded in the history table to provide evidence of the end of access permission. In another optional step 1510, an end permission complete message is sent to host system 102 to indicate that this host system no longer has access permission to the appropriate LDEV in the disk subsystem 109.

In specific embodiments employing the time-lock service mode, billing processing may be simplified by using fixed billing based upon the terms of the SLA. In a fixed billing system, the billing rate and access times from the SLA are used to compute the charge. Thus, the billing procedure is simplified because the storage access service system 108 does not need to search the access history in the LDEV access history table 300 to determine the access charges.

Figure 16:
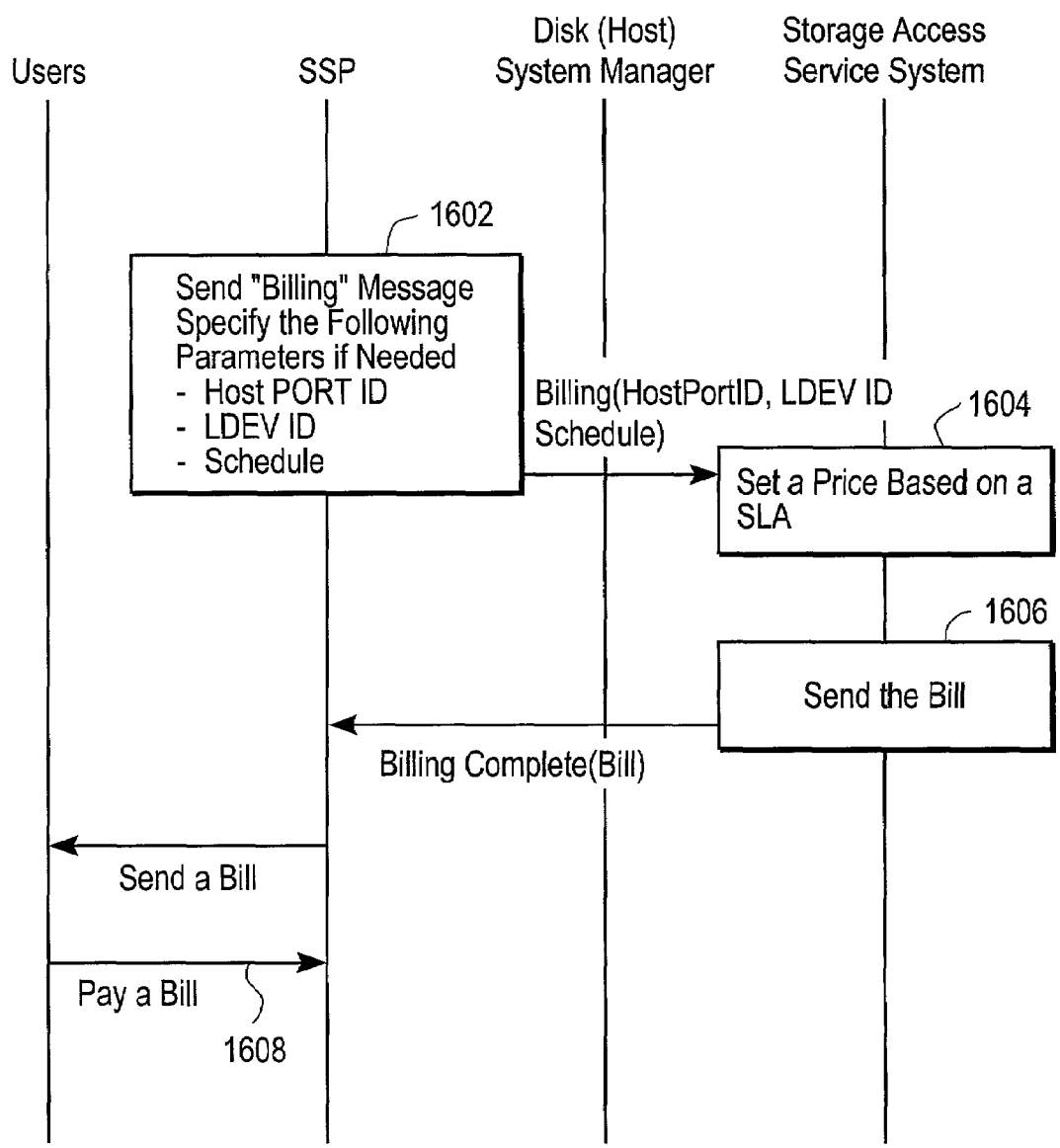
FIG. 16 illustrates a flowchart of a representative fixed billing processing in a specific embodiment of the present invention.

FIG. 16 illustrates a flowchart of a representative fixed billing processing in a specific embodiment of the present invention. In fixed billing processing, the SSP prepares a bill according to the price set in the SLA, without reference to the service history, and sends the bill to the SSP users. As illustrated by FIG. 16, in a step 1602, the SSP sends a billing message to the storage access service system 108 in order to initiate the billing processing. If the SSP requires a bill for a specific SSP user, then the billing message includes a plurality of parameters, such as a host port ID, an LDEV ID, and an access schedule. Then, in a step 1604, the storage access service system 108 determines the cost of the service from the price and terms agreed upon by the SSP and the SSP user in the SLA. Then, in a step 1606, the storage access service system 108 sends the bill to the SSP. The SSP forwards the bill to the SSP user. In an alternative embodiment, the storage access service system 108 sends the bill directly to the SSP users. In a step 1608, payment is received from the SSP user.

In a yet further embodiment according to the present invention, a semi-timecard storage access service is provided. This embodiment will now be described with respect to FIGS. 8 through 15. In the semi-timecard storage access service mode, users who choose the time-lock storage access service are provided with the capability to change the access schedule in order to accommodate an accident, power outage, unexpected heavy workloads, or the host system failures, for example. In a specific embodiment employing semi-timecard storage access service mode, the SSP provides the time-lock storage access service with SSP users. Thus, the storage access service system 108 sends a start permission message to initiate access permission and an end permission message to terminate access permission automatically. The storage access service system 108 performs these operations in accordance with the time-lock storage access service flow described herein above with respect to FIGS. 14 and 15.

If the SSP user desires to change the access schedule, then the SSP user notifies the SSP of the change. If the SSP user notifies the SSP of a change in schedule, then the storage access service system 108 changes the scheduling for the automatic control of the storage access. Accordingly, the storage access service system 108 sends a start permission message automatically, as described above with reference to FIG. 14, and the SSP users send an end access message to the storage access service system 108, as described above with reference to FIG. 9, in order to change the scheduled end time. Furthermore, the SSP users send a start access message to the storage access service system 108, as described above with reference to FIG. 8, and the storage access service system 108 sends an end permission message automatically, as described above with reference to FIG. 15, in order to change the scheduled start time.

If the host system 102 attempts to access to the LDEV beyond the period defined in the access schedule attribute in the corresponding entry of the LDEV access schedule management table 200, the disk system 109 does not accept I/O requests from the host system 102, and an access error is returned to the host system 102. In a specific embodiment employing semi-timecard storage access mode, billing is performed in accordance with the variable billing flow described herein above with reference to FIG. 13. The storage access service system 108 searches the access history in the LDEV access history table 300, and determines the cost of access service based upon the access history and the terms of the SLA.

The present invention provides for specific embodiments in which SSPs are able to provide more flexible storage access services based on access time of the SSP users. Further, in specific embodiments, SSP users benefit from greater confidentiality afforded by the enhanced security restrictions preventing unauthorized access to data.

By virtue of specific embodiments according to the present invention, SSPs can introduce a price model based upon the time of access to SSP resources. For example, the SSPs can make the price of off-peak time cheaper than that of peak time. Some users would like to use the data connection at a lower cost, and are willing to accept limitations on the time of access to SSP resources. The SSPs are able to meet the needs of such clients, enabling the SSPs to provide access services to a larger number of clients.

Moreover, certain SSPs maintain points of presence (POP) all over the world. Such SSPs can introduce different price models for each of the different time zones throughout the world. When one SSP site is in a peak time, another SSP site in another time zone may be in an off-peak time. Thus, there exists the capability for SSPs to provide off-peak time access rates to SSP users during a peak time by shifting the access to another SSP site. The SSPs can be provided with the capability to increase client base all over the world.

The preceding has been a description of the preferred embodiment of the invention. It will be appreciated that deviations and modifications can be made without departing from the scope of the invention, which is defined by the appended claims.

What is claimed is:

1. An apparatus for managing storage access, comprising:
    a disk system including multiple storage devices capable of being coupled to a host system via interface ports and a data communication channel;
    time components comprising time zone information;
    a disk system manager operative to control accessibility by the host system to the multiple storage devices based upon a service level agreement and the time component, the service level agreement specifying billing rates based upon the time components, the disk system manager capable of being coupled to the host system via a control communication channel that is different from the data communication channel;

a storage access service system operative to grant time-based host system access to said multiple storage devices and to compute invoice amounts based upon the time component and the service level agreement, and wherein said storage access service system determines charges for user access by comparing said preset schedule to a billing rate schedule and thereupon computing a cost of said preset schedule; and means for users to agree to access at least one of said storage devices during a preset schedule, and wherein said storage access service system determines charges for user access service based upon said preset schedule.

2. The apparatus of claim 1, wherein said storage access service system determines charges for user access based upon a history of accesses.

3. The apparatus of claim 2, wherein said storage access service system determines charges by comparing said history of accesses to a billing rate schedule and thereupon computing a cost of access by summing a cost for each access according to said billing rate schedule.

4. The apparatus of claim 1, wherein said storage access service system determines charges by comparing said preset schedule to a billing rate schedule to determine an applicable billing rate, and thereupon computing a cost of said preset schedule in a billing cycle.

5. A method for managing access to storage resources in a system having a plurality of tables, comprising:

storing user information including an identity of a user an identity of a resource, a time zone, and at least one billing rate for accessing said resource in a first table of the plurality of tables the at least one billing rate being dependent on a predetermined time component in accordance with a service level agreement;

receiving a computer-based request to access said resource from a user;

granting access to said resource based upon said identity of said user, said identity of said resource, the time of the request, and said time zone using the first table said granting including enabling the user to access the resource via a data communication channel;

using a control communication channel to map the resource to the user;

storing access information including said identity of said user, said identity of said resource, and said time zone in a second table of said plurality of tables; and determining charges for accessing said resource based upon said identity of said user, said identity of said resource, the time of the access, and said at least one billing rate using the first table and the second table.

6. The method of claim 5, further comprising: logging individual instances of access to said resource into a history of accesses in said second table.

7. The method of claim 6, wherein determining charges for a user based upon individual instances of access by said user of said resource, said time zone, and said at least one billing rate comprises:

determining a usage time for each individual instance of access selected from said history of accesses;

determining a billing rate corresponding to said usage time from among said at least one billing rate; and computing a cost by summing a cost for each individual instance of access selected from said history of accesses, said cost computed by multiplying said usage time by said billing rate corresponding to said usage time.

8. The method of claim 7, wherein said at least one billing rate corresponds to at least one of a plurality of time periods for said time zone, and wherein determining a billing rate corresponding to said usage time from among said at least one billing rate comprises:

comparing said individual instances of accesses logged into said history of accesses to said plurality of time periods to select a billing rate corresponding to said usage time from among said at least one billing rate.

9. The method of claim 5, wherein said user agrees to access said resource at a time period in accordance with a preset schedule; and wherein said granting access to said resource based upon said identity of said user, said identity of said resource, and said time zone comprises:

granting said user access to said resource within said time period in accordance with said preset schedule.

10. The method of claim 9, wherein said at least one billing rate for accessing said resource corresponds to at least one of a plurality of time periods for said time zone, and wherein determining charges for accessing said resource based upon said identity of said user, said identity of said resource, said at least one billing rate, and said time period comprises:

selecting from among a plurality of billing rates a billing rate corresponding to said time period in accordance with said preset schedule; and computing a cost of access by summing a cost for each individual instance of said time period in accordance with said preset schedule multiplied by said billing rate corresponding to said time period in accordance with said preset schedule.

11. The method of claim 9, wherein said at least one billing rate for accessing said resource corresponds to at least one of a plurality of time periods for said time zone, and wherein determining charges for accessing said resource based upon said identity of said user, said identity of said resource, said at least one billing rate, and said time period comprises:

selecting from among a plurality of billing rates a billing rate corresponding to said time period in accordance with said preset schedule; and computing a cost of access by multiplying said billing rate corresponding to said time period by a number of instances of said time period occurring in a billing cycle in said preset schedule.

* * * * *